Oct. 20, 1925.  1,558,278
E. PHILLIPS
COMBINED TOY AND HEATING DEVICE
Filed Dec. 1, 1923
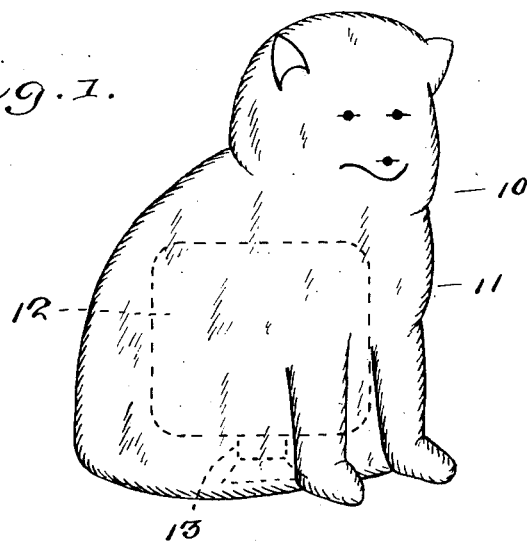
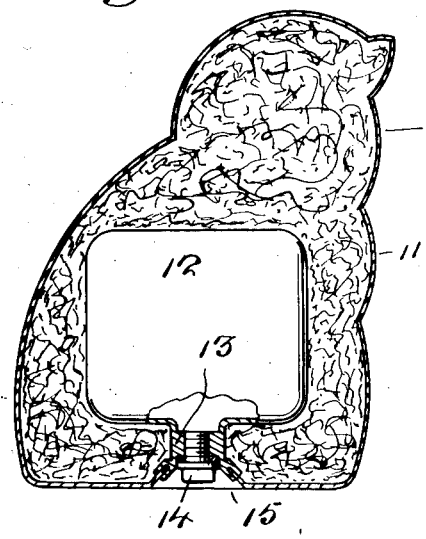
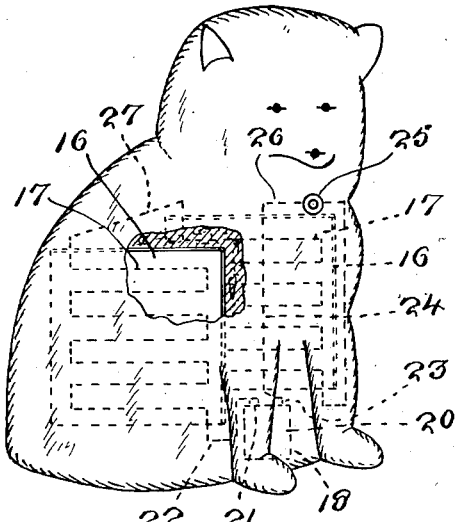
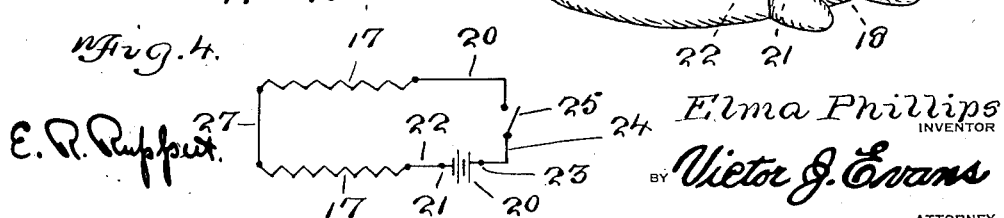
Elma Phillips
INVENTOR Patented Oct. 20, 1925.

1,558,278

UNITED STATES PATENT OFFICE.

ELMA PHILLIPS, OF DOVER PLAINS, NEW YORK.

COMBINED TOY AND HEATING DEVICE.

Application filed December 1, 1923. Serial No. 677,997.

*To all whom it may concern:*

Be it known that I, ELMA PHILLIPS, a citizen of the United States, residing at Dover Plains, in the county of Dutchess and State of New York, have invented new and useful Improvements in Combined Toy and Heating Devices, of which the following is a specification.

This invention relates to toys, particularly to stuffed figures of animals or the like and has for its object the provision of a figure resembling an animal so as to be pleasing and attractive to children and containing heating means whereby the device may be carried to bed by a child and used for warming the feet or other members, or whereby the device may be carried out of doors for keeping the hands warm instead of carrying the hands in a muff or in the pockets.

An important object is the provision of a device of this character in which the heating means might be considerably varied in its nature depending upon the cost of production.

An additional object is the provision of a combined toy and heater which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a perspective view of the device,

Figure 2 is a vertical section therethrough showing one form of the invention and Figure 3 is a sectional view illustrating a modification.

Referring more particularly to the drawings the numeral 10 designates a body covered with fabric, fur or the like indicated at 11. In actual practice it is intended that the body be made to resemble an animal such as a dog, cat, teddy bear or the like, though of course it need not have such a configuration. The idea of such a design is to make the device attractive to children so that it will be used as a toy.

In the first form I have shown a hot water bottle 12 of some suitable material, preferably aluminum, which is embedded within the body 10 and held therein in an obvious manner. This bottle or receptacle has a neck portion 13 normally closed by a stopper 14 to which access may be had through a suitable opening 15 in the bottom of the figure so that the receptacle may be filled with hot water when its use as a heater is desired.

In some instances it may be desired to make the device of a more expensive nature, and in such case I replace the aluminum hot water bottle with electric heating means which is here shown as consisting of two units each including a pair of asbestos sheets 16 suitably mounted at opposite sides of the body. Between each pair of sheets is a resistance coil 17, which coils are here shown as being connected in series though they could be connected in parallel if preferred. Removably mounted within a cavity 18 in the bottom of the body and accessible through an opening 19 therein, is a battery 20 which has one terminal 21 connected by a wire 22 with one terminal of one coil 17, and which has its other terminal 23 connected by a wire 24 with a suitable switch 25 mounted at any desired point in the body. Leading from the switch is a wire 26 which connects with one terminal of the other coil 17, both coils being connected by a wire 27.

In the operation of this second form it is obvious that when the switch is closed current will pass through the resistance coils and generate sufficient heat to warm the entire device so that it may be used for keeping the hands warm in cold weather or taken to bed to serve for warming the feet.

While I have shown and described the preferred embodiment of my invention it is of course to be understood that I reserve the right to make such changes in the form, construction and arrangement of parts as will not depart from the spirit of the invention or the scope of the subjoined claim.

Having thus described my invention I claim:

In a device of the character described, a body formed of flexible material and provided with a resilient stuffing, a water receptacle embedded within the stuffing and having a thickened neck portion located at the bottom portion of the body and provided with a removable closure element, the outer end of said neck portion being grooved and the edge of the flexible material being engaged within the groove, said neck portion being set inwardly with respect to the outer surface of the body and the body being recessed at said neck portion to permit access to the closure element.

In testimony whereof I affix my signature.

Miss ELMA PHILLIPS.